UNITED STATES PATENT OFFICE.

CLARENCE DELAFIELD, OF STATEN ISLAND, NEW YORK.

IMPROVEMENT IN THE MANUFACTURE OF SALTPETER.

Specification forming part of Letters Patent No. 52,145, dated January 23, 1866.

*To all whom it may concern:*

Be it known that I, CLARENCE DELAFIELD, of Staten Island, in the county of Richmond and State of New York, have invented certain new and useful Improvements in the Art of Manufacturing Saltpeter; and I do hereby declare the following to be a full, clear, and exact description of the same.

My improvement in the art of manufacturing saltpeter consists in taking, first, fifty-four parts of nitric acid and one hundred and four parts of lead and unite them in about seven times their weight of water; then take about eighty-five parts of the carbonate of potash and unite it with about five times its weight of water; then mix the nitrate of lead and water thus formed with the carbonate of potash and water, and the result will be nitrate of potash, or saltpeter, and carbonate of lead, or white lead, the whole of the chemical constituents being at once resolved into these two articles of commerce.

The above proportions may be varied somewhat; but they will be found to give good results as they stand.

It will be seen that in manufacturing saltpeter after this process white lead results as a valuable commercial residue of the nitrate of potash, being, in fact, the manufacture of two valuable commercial articles at one time by the same process.

Having now described my improvement in the art of manufacturing saltpeter, I claim and desire to secure by Letters Patent—

1. Manufacturing saltpeter by the use of the above-described chemicals, or their equivalents for this purpose, so combined, applied, or united as to yield white lead as the residue of the process.

2. The use of the above-described chemicals, or their equivalents for this purpose, when so combined, united, or applied as to produce the saltpeter of commerce.

3. The manufacture of the saltpeter of commerce by substantially the above-described process.

CLARENCE DELAFIELD.

Witnesses:
AMOS BROADNAX,
PETER D. KENNY.